United States Patent [19]

Simon

[11] 4,171,639

[45] Oct. 23, 1979

[54] DEVICE FOR MEASURING THE RADIAL FORCE SUSTAINED OR TRANSMITTED BY A HOLLOW ROTATING COMPONENT

[76] Inventor: François Simon, Route d'Annecy, 73410 Albens, France.

[21] Appl. No.: 934,430

[22] Filed: Aug. 17, 1978

[30] Foreign Application Priority Data

Sep. 5, 1977 [FR] France ................................ 77 26845

[51] Int. Cl.² .............................................. G01L 5/04
[52] U.S. Cl. ................................................ 73/141 A
[58] Field of Search ..................... 73/787, 143, 133 R, 73/141 R, 141 A

[56] References Cited

U.S. PATENT DOCUMENTS

| | | | |
|---|---|---|---|
| 4,037,469 | 7/1977 | Nordstrom et al. | 73/141 A |
| 4,117,719 | 10/1978 | Schutz | 73/141 A |

Primary Examiner—Jerry W. Myracle
Attorney, Agent, or Firm—Peter L. Berger

[57] ABSTRACT

The hollow rotating component such as a pulley, toothed wheel, drum and the like is mounted on a stationary hollow coaxial component in the form of a ring. The ring is coupled to a stationary support by means of a rigid mechanical part so arranged as to ensure that the internal space which is common to both components is left completely unobstructed and also given freedom of access. A detector or transducer for measuring deformations is mounted between the ring and the support.

9 Claims, 12 Drawing Figures

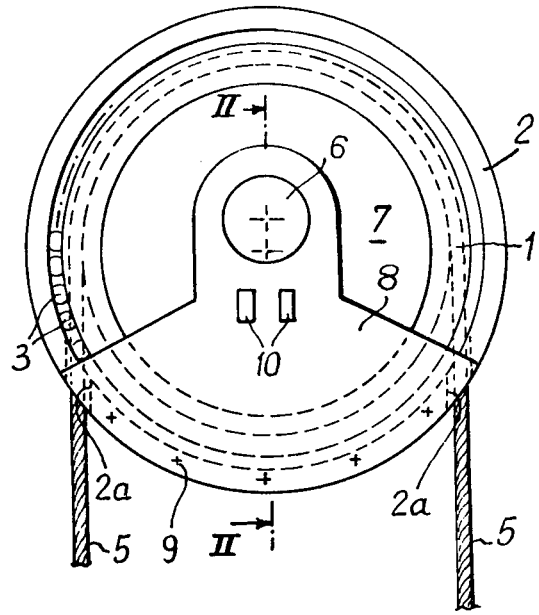
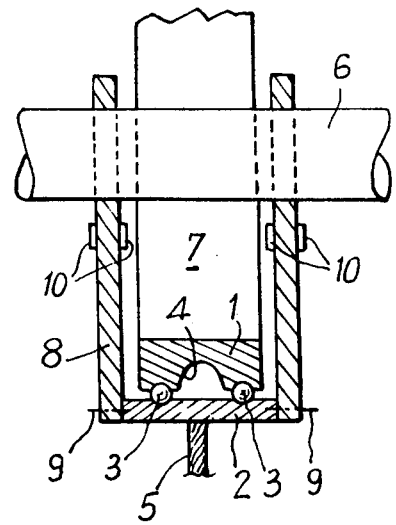
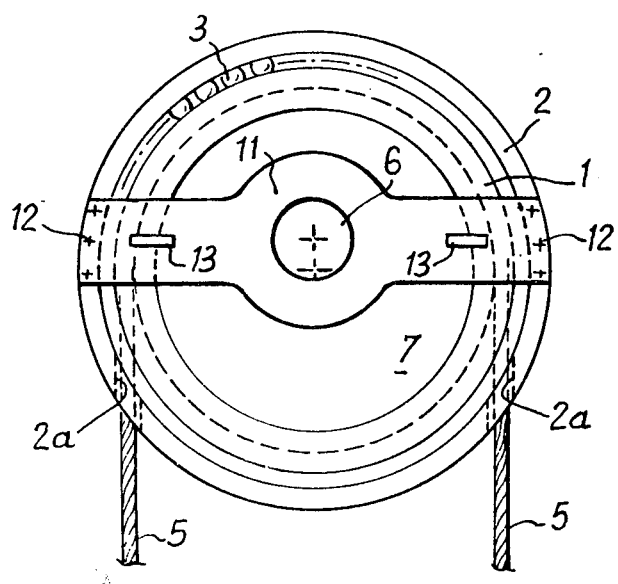

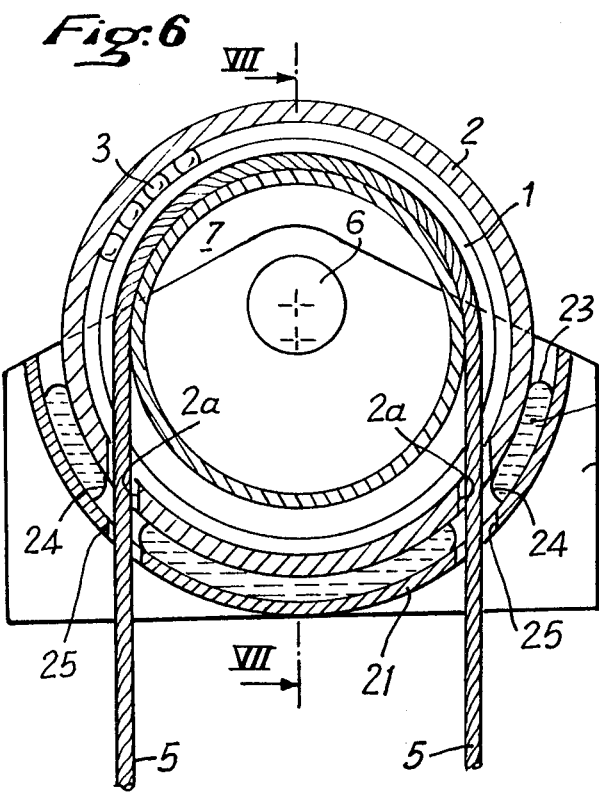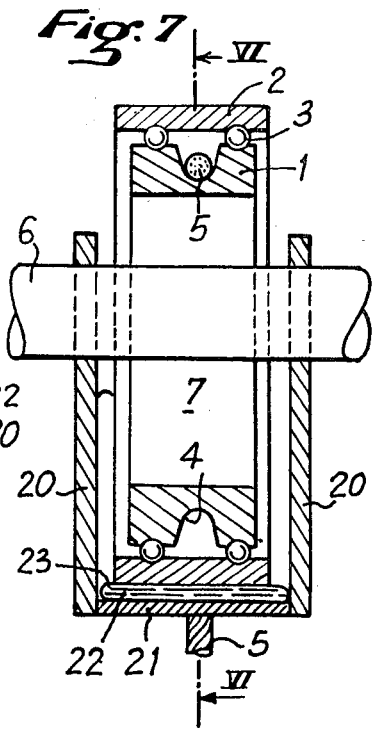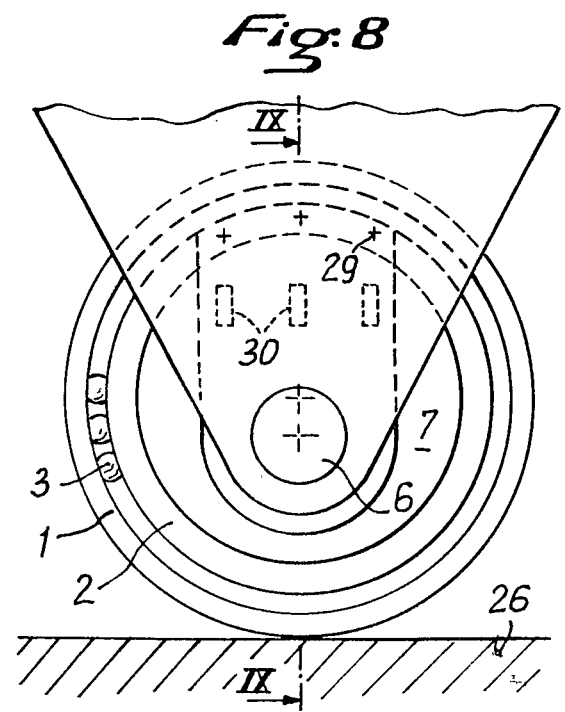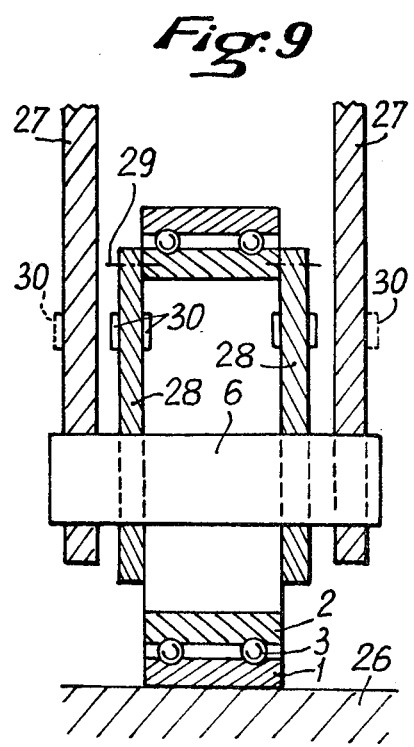

DEVICE FOR MEASURING THE RADIAL FORCE SUSTAINED OR TRANSMITTED BY A HOLLOW ROTATING COMPONENT

The invention relates to a device for measuring the radial force sustained or transmitted by a hollow rotating component and especially a pulley, runner-wheel, toothed wheel or drum.

A device of this type is already known and was disclosed in French Pat. No. 74 24304 filed by the present Applicant. In this device, the rotating component is mounted on a stationary coaxial component having two radial side-plates which provide a direct or indirect coupling with the support which is usually a transverse shaft. In this device, at least one detector is placed either on the stationary component or on the side-plates or on the means for providing a coupling between the side-plates and the support.

The main object of the invention is to provide a device of novel design which makes it possible to dispense with the need for side-plates.

To this end, the device in accordance with the invention for measuring the radial force sustained or transmitted by a hollow rotating component mounted on a stationary hollow coaxial component in the form of a ring is characterized in that said ring is coupled to a stationary support by means whereby the internal space which is common to said components is left free and given freedom of access, and that at least one detector is placed between said ring and said support.

The means for coupling the ring with the support can be constituted either by at least one rigid mechanical part, in which case the detector is a transducer for measuring deformations of said rigid part, or by the detector itself which is in that case a displacement or pressure transducer.

Further distinctive features of the invention will become apparent from the following description of a few embodiments, reference being made to the accompanying drawings, in which:

FIG. 1 is a diagrammatic view in axial elevation showing a device in accordance with a first embodiment of the invention;

FIG. 2 is a sectional view taken along line II—II of the device shown in FIG. 1;

FIG. 3 is a view which is similar to FIG. 1 and relates to an alternative embodiment;

FIG. 6 is a sectional view taken along line VI—VI of FIG. 7 and showing another alternative embodiment;

FIG. 7 is a sectional view taken along line VII—VII and showing the device of FIG. 6;

FIG. 8 is a diagrammatic view in side elevation showing yet another alternative embodiment;

FIG. 9 is a sectional view taken along line IX-IX and showing the device of FIG. 8;

Figure 4:
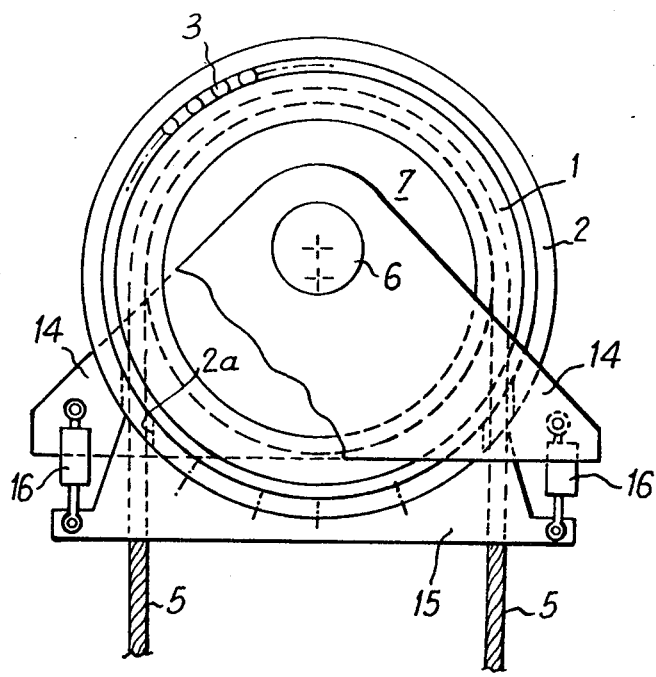
FIGS. 4 and 5 are diagrammatic cutaway views in axial elevation showing three further alternative embodiments.

The device shown in FIGS. 1 and 2 comprises two coaxial annular components 1, 2, the stationary component 2 in the form of a ring being intended to surround the rotating component 1. Ball bearings represented diagrammatically by balls 3 ensure free rotation of the component 1 within the component 2. By way of example, the component 1 is a grooved pulley or sheave 4 which receives a lifting or coupling cable 5 over 180°. The inner component 1 is hollow. The ring 2 is provided with openings 2a through which the cable 5 is permitted to pass.

The aim of the invention is to measure the radial force exerted between the component 1 and a stationary support such as a shaft 6, for example, without occupying or obstructing the internal space 7 of the component 1.

In the example shown in FIGS. 1 and 2, the cable 5 carries a load (not shown) and it is accordingly desired to measure the vertical force produced by this load. To this end, the shaft 6 which is eccentrically displaced in the upward direction with respect to the components 1, 2 for reasons of stability is adapted to carry two vertical arms 8 located on each side of the assembly of components 1, 2. By way of example, said arms 8 are secured at 9 to the lower portion of the radial faces of the ring 2 by means of bolts, provision being made on said arms for transducers 10 in the form of strain gages. The information provided by the gages 10 is utilized in known manner for the purpose of giving an indication of the radial force transmitted from the rotating component 1 to the stationary shaft 6.

It should be noted that the arms 8 leave the space 7 completely free within the inner component 1 and also permit freedom of access to said space.

The device shown in FIG. 3 is similar to that of FIGS. 1 and 2 in regard to the elements 1 to 7 and reference can accordingly be made to the foregoing description of the device. The shaft 6 no longer carries two vertical arms but two horizontal arms 11 which are secured at 12 by means of bolts, for example, to those portions of the radial faces of the ring 2 which are located at the level of the shaft 6. Gages 13 are placed on the arms 11. The deformations measured by said gages are flexural deformations whereas these latter were tensile deformations in FIGS. 1 and 2.

It will be noted from FIG. 3 that the space 7 and the access to this latter are also left free.

In the embodiments of FIGS. 1 to 3, the detectors are located on the coupling means (arms 8, 11) which provide a connection between the component 1 and the support (shaft 6). In the embodiments of FIGS. 4 to 7, the detectors form part of said coupling means.

In the embodiment shown in FIG. 4 which is similar to the devices of FIGS. 1 to 3 in the case of the elements 1-7, the shaft 6 carries two triangular arms 14 and the lower portion of the ring 2 is adapted to receive a cradle 15, the ends of which are located opposite to the ends of the arms 14, tension transducers 16 being placed between the arms 14 and the cradle 15. By way of example, these transducers consist of jacks in which the measured pressure is representative of the force transmitted.

Figure 5:
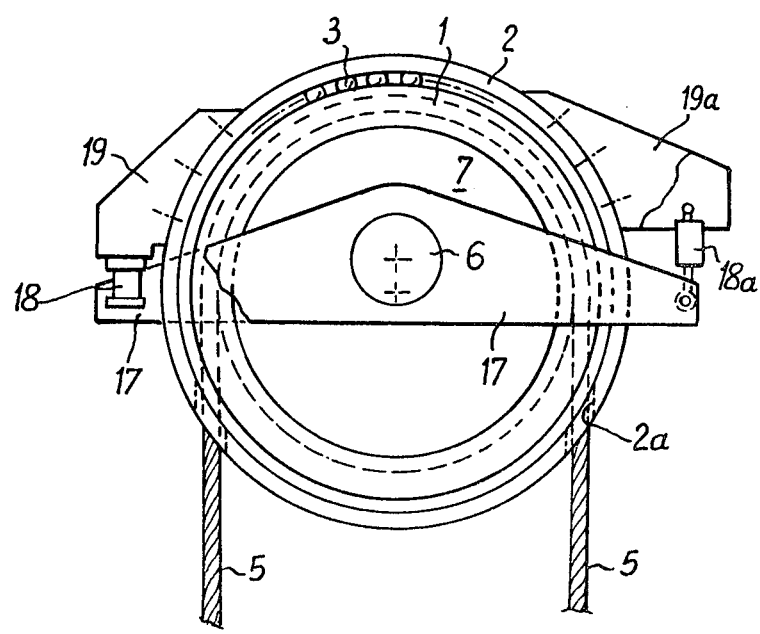

The embodiment shown in FIG. 5 differs from that of FIG. 4 only in the arrangement of the coupling means and of the detectors. As in FIG. 3, the shaft 6 carries two horizontal arms 17 on which are supported by means of compression transducers 18 such as jacks 18a, for example, lugs 19, 19a which are secured to the upper portion of the ring 2.

The embodiment of FIGS. 6 and 7 again differs from that of FIG. 5 only in the arrangement of the coupling means and of the detectors. The shaft 6 carries two side cheeks 20 on which is mounted a cylindrical cradle 21 which is coaxial with the components 1, 2; the lower portion of the ring 2 is supported on the cradle 21 by means of a fluid cushion 22 enclosed within a lining membrane 23. The assembly 22, 23 assumes a shape which is also cylindrical, provision being made for cable passages 24 through the assembly; similarly, the cradle 21 is provided with openings 25 for the same purpose.

Measurement of the pressure which prevails within the fluid cushion makes it possible to determine the force applied to this latter. In this embodiment, the direction of the force to be measured is variable.

In the embodiment shown in FIGS. 8 and 9, the rotating component 1 is located externally with respect to the stationary component 2 and intended to roll on a surface 26. The profile of the outer face of the component 1 and the profile of the surface 26 are suitably chosen according to the applications which are contemplated. For example, the surface 26 can have the shape of a rail and the outer face of the component 1 can have a corresponding shape. The shaft 6 which is eccentrically displaced in the downward direction with respect to the components 1, 2 is adapted to receive two vertical arms 27 for carrying the load, the resultant force of which is to be measured. Two vertical arms 28 are also attached to the shaft 6 and rigidly fixed at 29 by means of bolts, for example, to the upper portion of the radial faces of the stationary inner component 2. Strain gages 30 are placed on the arms 28 or (as shown in chain-dotted lines) on the arms 27.

Figure 10:
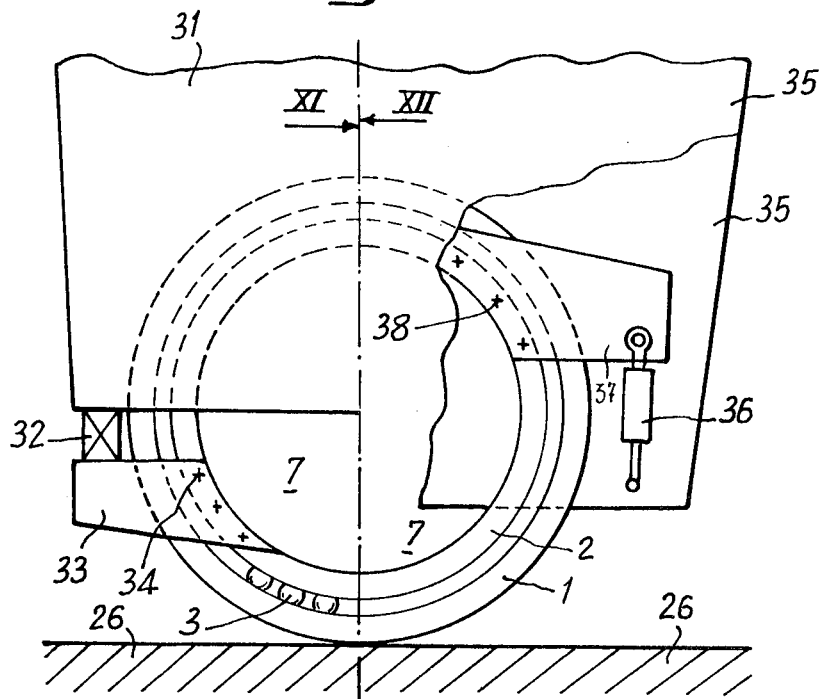
FIG. 10 is a diagrammatic cutaway and double view in axial elevation showing two further alternative embodiments.
Figure 11:
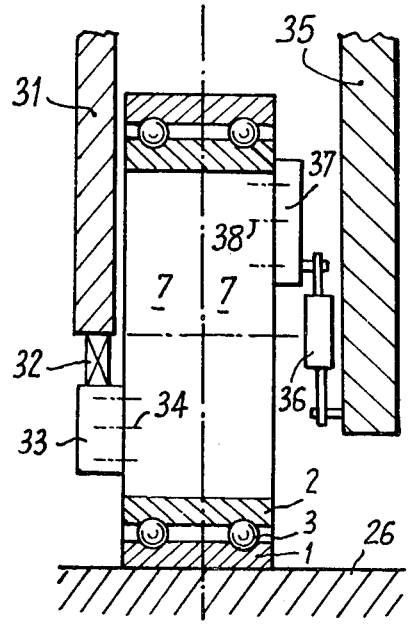
FIG. 11 is a double sectional view, the right half being taken along line XI—XI and the left half being taken along line XII—XII of FIG. 11.

The two embodiments which are shown together in each of FIGS. 10 and 11 differ from the embodiment shown in FIGS. 8 and 9 only in the arrangement of the coupling means and of the detectors.

In the embodiment shown in the left half of FIGS. 10 and 11, two arms 31 designed to carry the load are supported by means of compression transducers 32 on lugs 33 which are secured by means of bolts at 34 to the lower portion of the radial faces of the stationary inner component 2.

In the embodiment shown in the right half of FIGS. 10 and 11, two arms 35 are intended to carry the load and suspended by means of tension transducers 36 such as jacks, for example, from lugs 37 which are secured by means of bolts at 38 to the upper portion of the radial faces of the stationary inner component 2.

Figure 12:
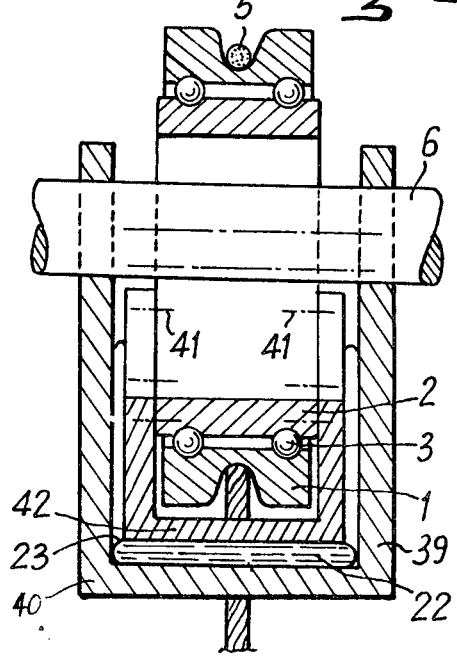
FIG. 12 is an axial sectional view of another alternative embodiment.

The embodiment of FIG. 12 is derived from that of FIGS. 6, 7 and essentially differs from this latter in that the rotating component 1 is located externally with respect to the stationary component 2. The shaft 6 which is eccentrically displaced in the upward direction with respect to the components 1, 2 carries an assembly 39 which forms a cradle 40 and receives an assembly 22, 23 which is similar to the previous embodiment. A cradle 42 located internally with respect to the cradle 40 is attached to the component 2 by means of bolts at 41 and fixed on the lower portion of the radial faces of said component. The cradles 40, 42 are cylindrical and in coaxial relation; the assembly 22, 23 extends between said cradles and the measured pressure of this latter is representative of the force transmitted by the component 1 to the shaft 6.

In the event that the rotating component 1 is located within the support 2, the following additional advantages are offered:

the area of distribution of forces applied by the rotating component on its support is larger and thus has the effect of reducing stresses;

the force on the support is located at the bottom, thus producing a stable equilibrium and removing limitations in the value of the angle at which the cable passes onto the rotating component;

the diameter of passage of the shaft within the internal space is no longer limited;

parasitic effects of oblique forces on the transducers are removed.

From the foregoing description of a few non-limitative embodiments, it is apparent that the device in accordance with the invention makes it possible to measure the applied radial force without occupying the internal space and without preventing access to this latter.

I claim:

1. A device for measuring the radial force sustained or transmitted by a hollow rotating component mounted on a stationary hollow coaxial component in the form of a ring, wherein said ring is coupled to a stationary support by means whereby the internal space which is common to said components is left free and also given freedom of access, and wherein at least one detector is placed between said ring and said support.

2. A device as defined in claim 1, wherein the detector is mounted on the coupling means between said ring and said support.

3. A device as defined in claim 2, wherein said coupling means are rigid.

4. A device as defined in claim 2, wherein the detector is of the deformation transducer type.

5. A device as defined in claim 1, wherein the detector is interposed in the chain of coupling means between said ring and said support.

6. A device as defined in claim 5, wherein the detector is constituted by a fluid cushion in which the pressure is measured.

7. A device as defined in claim 6, wherein the fluid cushion is trapped between a stationary cylindrical cradle and a complementary cylindrical surface which is rigidly fixed to the stationary component.

8. A device as defined in claim 1, wherein the rotating component is located internally with respect to U.S. the stationary component.

9. A device as defined in claim 1, wherein the stationary component is located internally with respect to the rotating component.

* * * * *